United States Patent
Chintakindi et al.

(10) Patent No.: US 10,247,557 B2
(45) Date of Patent: Apr. 2, 2019

(54) TRANSMITTING MAP DATA IMAGES IN A LIMITED BANDWIDTH ENVIRONMENT

(71) Applicant: HERE Global B.V., Veldhoven (NL)

(72) Inventors: Sunil Kumar Chintakindi, Naperville, IL (US); Anatoly Belkin, Glenview, IL (US)

(73) Assignee: HERE Global B.V., Eindhoven (NL)

( * ) Notice: Subject to any disclaimer, the term of this patent is extended or adjusted under 35 U.S.C. 154(b) by 238 days.

(21) Appl. No.: 14/502,400

(22) Filed: Sep. 30, 2014

(65) Prior Publication Data

US 2016/0091321 A1 Mar. 31, 2016

(51) Int. Cl.
*G01C 21/26* (2006.01)
*H04L 29/08* (2006.01)
(Continued)

(52) U.S. Cl.
CPC .............. *G01C 21/26* (2013.01); *G01C 21/32* (2013.01); *G01C 21/3694* (2013.01); *G06T 9/00* (2013.01); *G08G 1/092* (2013.01); *G08G 1/096716* (2013.01); *G08G 1/096741* (2013.01); *G08G 1/096775* (2013.01); *H04H 60/70* (2013.01);
(Continued)

(58) Field of Classification Search
CPC .... G01C 21/26; G01C 21/32; G01C 21/3694; G08G 1/092; G08G 1/096716; G08G 1/096741; G08G 1/096775; G06T 9/00; H04H 60/70; H04H 20/55; H04L 67/1095; H04N 19/70
See application file for complete search history.

(56) References Cited

U.S. PATENT DOCUMENTS 5,898,680 A * 4/1999 Johnstone ............ H04B 10/118
340/995.1
6,233,518 B1 5/2001 Lee
(Continued)

FOREIGN PATENT DOCUMENTS

CN 103218910 7/2013
EP 1198792 A1 4/2002
(Continued)

OTHER PUBLICATIONS

Matt Freeman, "Traffic Information Services: Making your commute better," http://www.crutchfield.com/S-X76ofk4Ssb5/learn/learningcenter/car/navigation/traffic_services.html, viewed Sep. 30, 2014.
(Continued)

*Primary Examiner* — Thomas G Black
*Assistant Examiner* — Ce Li Li
(74) *Attorney, Agent, or Firm* — Lempia Summerfield Katz LLC

(57) ABSTRACT

Systems, methods, and apparatuses are provided for transmitting map data images in a limited bandwidth environment. In one embodiment, the method comprises determining or predicting, using a processor, a traffic condition or a weather condition for a location. The method further comprises developing at least one map image depicting the traffic condition or weather condition. The method further comprises encoding the map image in at least one payload. The method further comprises transmitting the at least one payload over-the-air to a navigation device.

12 Claims, 7 Drawing Sheets

(51) Int. Cl.
  *H04W 8/08* (2009.01)
  *G01C 21/32* (2006.01)
  *G01C 21/36* (2006.01)
  *H04H 60/70* (2008.01)
  *G08G 1/09* (2006.01)
  *G08G 1/0967* (2006.01)
  *G06T 9/00* (2006.01)
  *H04N 19/70* (2014.01)
  *H04H 20/55* (2008.01)

(52) U.S. Cl.
  CPC ......... *H04L 67/1095* (2013.01); *H04N 19/70* (2014.11); *H04W 8/08* (2013.01); *H04H 20/55* (2013.01)

(56) References Cited

U.S. PATENT DOCUMENTS

| | | | |
|---|---|---|---|
| 6,336,074 B1* | 1/2002 | Woo | G01C 21/26 340/988 |
| 6,532,413 B1* | 3/2003 | Lee | G08G 1/0962 701/117 |
| 7,032,027 B1* | 4/2006 | Meissner | H04L 49/90 709/230 |
| 7,415,356 B1* | 8/2008 | Gowda | G01C 11/00 342/357.31 |
| 7,747,381 B2 | 6/2010 | Adachi | |
| 8,334,790 B2 | 12/2012 | Rozum | |
| 8,489,324 B2 | 7/2013 | Hendrey | |
| 8,520,852 B2 | 8/2013 | Shah | |
| 8,660,479 B2 | 2/2014 | Johnson | |
| 8,738,638 B1* | 5/2014 | Koshelev | G01C 21/367 701/532 |
| 2001/0002937 A1* | 6/2001 | Warner | G06T 9/00 382/232 |
| 2005/0086383 A1* | 4/2005 | Le | H04L 69/04 709/247 |
| 2008/0095096 A1* | 4/2008 | Cho | G01C 21/26 370/328 |
| 2008/0215240 A1 | 9/2008 | Howard | |
| 2010/0128797 A1* | 5/2010 | Dey | H04N 19/176 375/240.24 |
| 2011/0202266 A1 | 8/2011 | Downs | |
| 2013/0113831 A1* | 5/2013 | Giuffrida | G01C 11/02 345/634 |
| 2013/0158858 A1* | 6/2013 | Yang | G01C 21/3694 701/409 |
| 2013/0166187 A1* | 6/2013 | Saunders | G08G 1/096716 701/117 |
| 2013/0226442 A1* | 8/2013 | Lynch | G01C 21/3694 701/119 |

FOREIGN PATENT DOCUMENTS

| | | | |
|---|---|---|---|
| EP | 1198792 B1 * | 5/2005 | ............. G01C 21/32 |
| JP | 2006153882 | 6/2006 | |
| JP | 2009250756 A * | 10/2009 | |
| WO | WO0101370 A1 | 1/2001 | |
| WO | WO03039011 | 5/2003 | |

OTHER PUBLICATIONS

"Digital Radio in Poland: Mediamobile First to Broadcast Traffic Information Service," http://www.tdf-group.com/news/press-release/digital-radio-in-poland-mediamobile-first-to-broadcast-traffic-information, viewed Sep. 30, 2014.

PCT International Search Report and Written Opinion of the International Searching Authority dated Jan. 7, 2016 for corresponding PCT/IB2015/057343.

European Office Action for European Patent Application No. 15778748.2-1003, dated Oct. 30, 2018.

* cited by examiner

TRANSMITTING MAP DATA IMAGES IN A LIMITED BANDWIDTH ENVIRONMENT

FIELD

The following disclosure relates to transmitting map data images, or more particularly, transmitting digital map tiles and map data images (e.g., traffic data images) in a limited bandwidth environment.

BACKGROUND

Representation and distribution of real time traffic information may be data intensive. Mobile navigation devices (e.g., car or personal navigation devices) may not be connected to or in communication with a high speed network for real time traffic updates. In certain cases, the mobile navigation device may be bandwidth constrained. For example, the mobile navigation device may only be able to receive and/or transmit up to a few kilobytes per second.

Current techniques designed to transmit traffic information to a mobile navigation device having bandwidth constraints include radio data system-traffic message channel (RDS-TMC) based location referencing, Agora-C map based location referencing, or transport protocol experts group (TPEG) methods. For example, a RDS-TMC system may use an AM or FM radio signal to send highly compressed bit streams of traffic data to a car or personal navigation system. Unfortunately, these current standards and techniques involve "coding up" as many of the road segments as possible in terms of pre-defined identifications or using latitude/longitude based representations. Therefore, there is a continuing effort to provide improved systems and methods for providing traffic data for a navigation system in a limited bandwidth environment.

SUMMARY

Systems, methods, and apparatuses are provided for transmitting digital map tiles and map data images in a limited bandwidth environment. In one embodiment, the method comprises determining or predicting, using a processor, a traffic condition or a weather condition for a location. The method further comprises developing at least one map image depicting the traffic condition or weather condition. The method further comprises encoding the map image in at least one payload. The method further comprises transmitting the at least one payload over-the-air to a navigation device.

In another embodiment, the method comprises receiving, by a navigation device via an over-the-air AM or FM radio transmission signal, at least one encoded map image, the at least one encoded map image comprising a traffic condition or a weather condition for a location. The method further comprises decoding, using a processor of the navigation device, a decoded map image from the at least one encoded map image. The method further comprises displaying at least a portion of the decoded map image on a navigation device display.

Apparatuses are also provided for determining real time traffic conditions. In one embodiment, an apparatus comprises at least one processor and at least one memory including computer program code for one or more programs, wherein the at least one memory and the computer program code configured to, with the at least one processor, cause the apparatus to at least perform: (1) determine or predict a traffic condition or a weather condition for a location; (2) develop at least one map image depicting the traffic condition or the weather condition; (3) encode the map image in at least one payload; and (4) transmit the at least one payload over-the-air to a navigation device.

In another embodiment, a navigation device comprises at least one processor and at least one memory including computer program code for one or more programs, wherein the at least one memory and the computer program code configured to, with the at least one processor, cause the navigation device to at least perform: (1) receive, via an over-the-air AM or FM radio transmission signal, at least one encoded map image, the at least one encoded map image comprising a traffic condition or weather condition for a location; (2) decode a map image from the at least one encoded map image; and (3) display at least a portion of the decoded map image on a navigation device screen.

BRIEF DESCRIPTION OF THE DRAWINGS

Exemplary embodiments are described herein with reference to the following drawings.

DETAILED DESCRIPTION

Figure 1A:
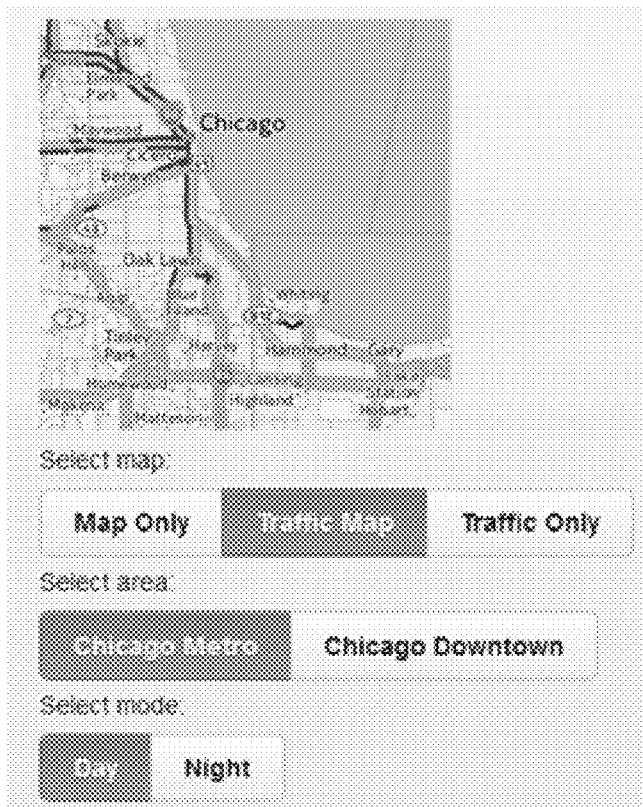
FIGS. 1a and 1b illustrate examples of a traffic map image for a metropolitan area in daytime and nighttime settings, respectively.

The following embodiments include systems, methods, and apparatuses for transmitting digital map tiles and map data images (e.g., traffic data images) in a limited bandwidth environment. As used herein, a "limited bandwidth environment" may refer to a mobile navigation device at least temporarily unable to receive or transmit data at a rate of at least 200 kilobits/sec (i.e., third-generation (3G) standards). In certain embodiments, the limited bandwidth environment refers to a device at least temporarily unable to receive and/or transmit data at a rate of at least 100 kilobits/sec, 50 kilobits/sec, 25 kilobits/sec, or 10 kilobits/sec. In certain embodiments, a limited bandwidth environment refers to a navigation device only able to receive and/or transmit data at a rate of 1-100 kilobits/sec, 1-50 kilobits/sec, 1-25 kilobits/sec, 1-10 kilobits/sec, or 5-10 kilobits/sec.

In certain embodiments, within the limited bandwidth environment, the navigation device may be able to receive and transmit (i.e., two-way communication) "over-the-air." Non-limiting examples of over-the-air transmissions include AM or FM radio transmission signals or Bluetooth UHF radio wave signals. In some embodiments, the navigation device is able to receive the over-the-air signal (e.g., AM or FM radio transmission signal), but is not able to transmit a signal (i.e., one-way communication).

In limited bandwidth situations, it may be difficult to transmit a large data file or map data images (e.g., traffic or weather data) to a navigation device efficiently. Therefore, alternative systems, apparatuses, and methods are needed to provide map information in these limited bandwidth settings. In certain embodiments, real-time map images (e.g., traffic or weather map images) may be developed and encoded. The encoded map images may be transmitted to the navigation device over-the-air (e.g., using an AM or FM transmission). The encoded map images may be received by the navigation device and decoded. The decoded images may then be displayed on the navigation device.

Such methods may allow for providing traffic information without having to wirelessly transmit a large data file or image to the mobile navigation device. Even low cost devices (e.g., devices without digital maps and little or no internet protocol connectivity) may be able to use digitized AM/FM signals to gain access to real time traffic data in and around the device's location.

Development of Map Images

Map images may be developed for any predefined map or road network, such as a metropolitan area or city (e.g., a selected area of a city or a selected number of road segments within a city). In some embodiments, the map images may be developed for multiple areas or road segments in multiple metropolitan areas or cities. The map images may be developed for one or more of the following: traffic data, weather data, accident data, or "special event" data.

Traffic map images may be developed from a collection and analysis of real-time traffic data. Real-time traffic data may be collected at defined intervals and the traffic map image updated based upon the most recent data collected. For example, real-time traffic map image may be developed/updated every hour, 30 minutes, 15 minutes, 10 minutes, 5 minutes, 2.5 minutes, 1 minute, etc.

In some embodiments, traffic map images may be developed from collection and analysis of real-time, historical, and/or predictive traffic data. Historical traffic data for a specific road segment may be collected for specified time segments or "epochs" to build a historical database. In some embodiments, traffic data may be collected at various epochs of a weekday, weekend, holiday, etc. In some examples, the traffic data is collected for every 5 minute epoch during rush hour and every 10 minute epoch for "off-hour" times.

Traffic data may be collected for the average speed of the observed vehicles within the road segment, the frequency of vehicles, and/or the average heading of the vehicles. In certain embodiments, traffic data may be collected from probe data extracted from devices (e.g., mobile phones) within the traveling vehicles, or from fixed monitoring locations.

Based on the collection of traffic data, traffic map images may be formed from the calculated average speed, frequency, and/or heading for each road or lane segment in real-time or at a determined historical time period. The traffic map images may be color-coded to depict the state of traffic for each road segment in the predefined road network. In other embodiments, the images may be marked in varying forms of dashed lines, etc. to depict the state of traffic. A machine-learning algorithm may be used to define what color or dashed line to code the road segment. In some embodiments, the color or dashed line may be determined based on a comparison between the average speed for the epoch and the speed limit for the road segment in real-time.

In certain embodiments, the road segment in the traffic map image may be color-coded green to represent traffic moving at a minimum percentage of the defined speed limit for the road segment. For example, the road segment may be color-coded green when the average speed is at 80% or greater of the speed limit (i.e., 80+ km/hr where the speed limit is 100 km/hr). Yellow color-codes may represent slower traffic conditions, representing traffic moving at a certain percentage of the defined speed limit (e.g., average speeds of between 40% and 80% of the speed limit). Red color-codes may represent even slower moving traffic in comparison to the defined speed limit for the road segment (e.g., average speeds less than 40% of the speed limit). Additional color-coding is also possible, such as a black color code designation for stand-still traffic (e.g., average speeds <5% of the speed limit), and orange for construction areas.

In certain embodiments, the road segment may include an individual color-code or dashed line for each lane of traffic (in each direction of travel). In other embodiments, the road segment may include multiple color-codes or different forms of dashed lines representing faster moving and slower moving zones within the road segment.

The number of overall traffic map images developed for the metropolitan location or city may be based on a number of different factors including, but not limited to the overall area of the location/city, the area of each traffic map image within the location/city, the number of node levels for the location/city (i.e., the number of sub-levels or zones within each level), the varying level of detail or types of roads depicted in the traffic map image (including whether or not the underlying road network is depicted at all), and/or the number of unique traffic images for each level or sub-level.

In certain embodiments, multiple views of a single traffic map image may be developed. For example, daytime and nighttime views of a traffic map image may be developed. A daytime view may include color-coded traffic segments overlaying a substantially light (e.g., white) background, while a nighttime view may include color-coded traffic segments overlaying a substantially dark (e.g., black) background for better viewing in low ambient light conditions.

Figure 1B:
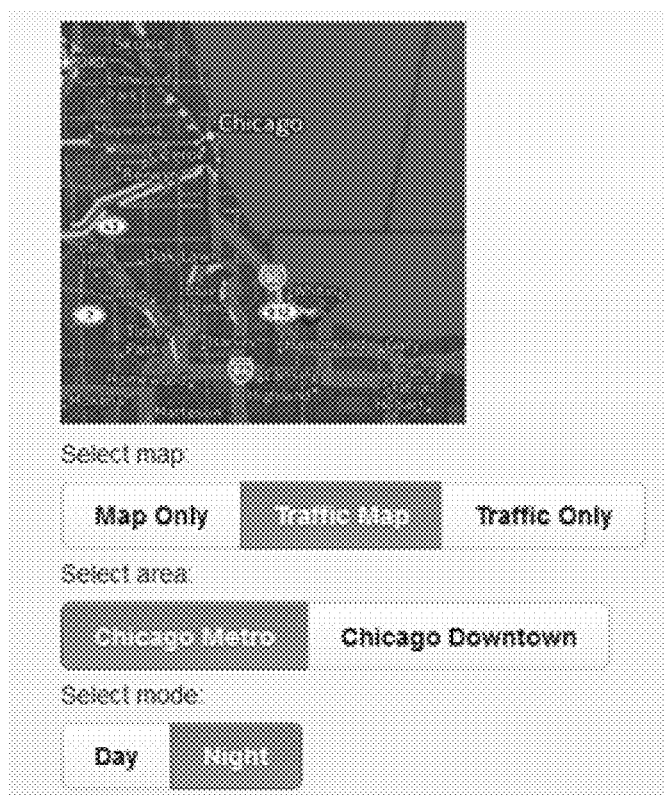

In a non-limiting embodiment, FIGS. 1a and 1b depict two different image configurations of the same traffic pattern. In FIG. 1a, a daytime view is depicted of a metropolitan area, wherein the traffic patterns are overlaid on a road network. FIG. 1b represents the same traffic pattern for the metropolitan area overlaid on the road network for a selected nighttime view.

To the extent an end-user may be interested in an expanded perspective of traffic in the city, this may be accomplished in two or three node levels to represent the entire city, and one or two zoomed in, sub-levels or nodes within the city. To the extent more narrowed or zoomed in views of a location are desired, additional sub-levels or nodes may be developed.

In addition to the development of traffic map images for a metropolitan area, weather map images may additionally or alternatively be developed from a collection and analysis of real-time weather data. Weather map images may be developed based on rain, snow, ice, etc. within the map area. Similar to the traffic map images, the weather map images may be color-coded to depict the state of weather for the map area. For example, the weather map image may be color coded based on the real-time radar intensity of the rain/snow precipitation (e.g., very light rain or snow is depicted in light blue, moderate rain is depicted in green, severe rain is depicted in red).

Encoding the Map Image Data

In limited bandwidth connectivity situations, current traffic and/or weather map image data may be encoded and transmitted to the navigation device without sending large amounts of data over-the-air. Instead, map images may be encoded for transmission in low bandwidth situations (e.g., situations wherein low sized images are readily transmit-table). The map image data (e.g., traffic and/or weather data) may be encoded in ASCII, UTF-8, ISO-8859-1, or XML, for example. In one particular embodiment, the map image data is encoded in ASCII format.

In certain embodiments, larger developed map image files (e.g., a single 64 kilobyte (KB) image file) may be broken up into smaller data files to be transmitted in multiple payloads. In certain embodiments, each payload of the multiple payloads is less than or approximately 1, 2, 4, 8, or 16 kilobytes. In one particular embodiment, each payload is approximately 4 kilobytes. The over-the-air transmission may be formatted or encoded to include data in a specific order (including image data transmitted in multiple payloads).

Figure 2:
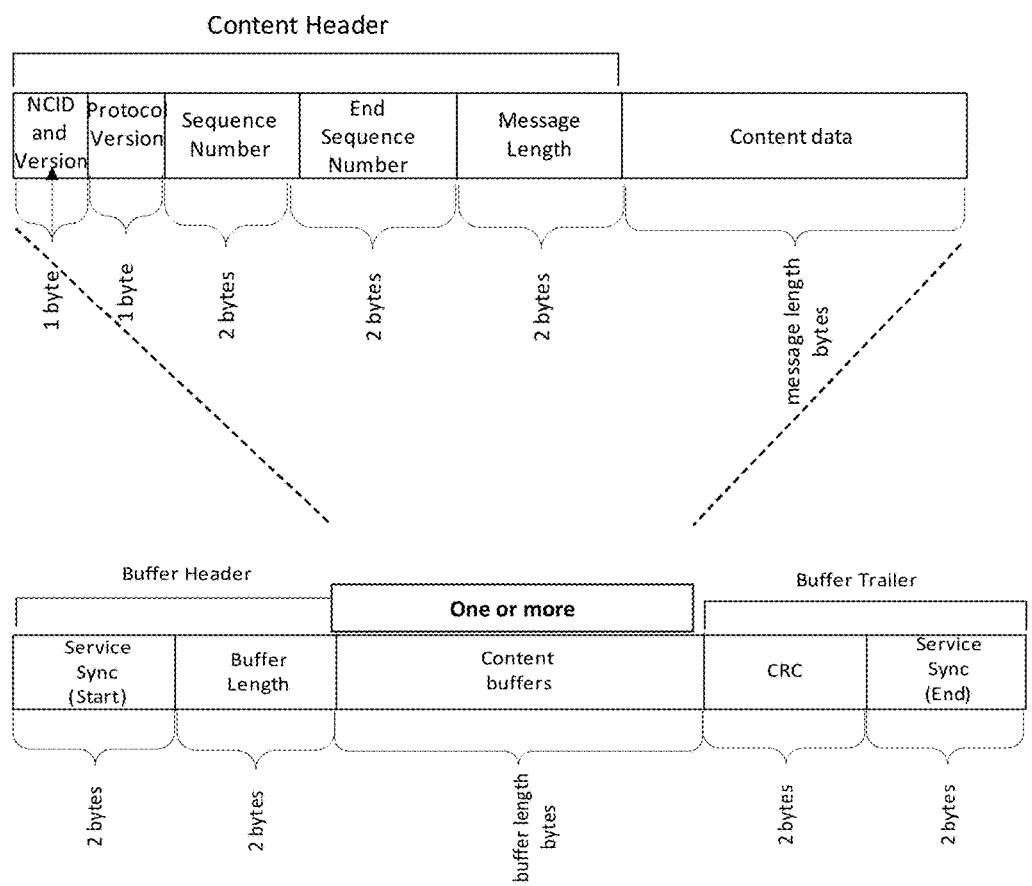
FIG. 2 illustrates an example of formatted or encoded map data for transmission to a navigation device.

FIG. 2 provides a non-limiting embodiment of the format of the encoded map data. For example, in FIG. 2, the transmission may include a content header with the content data. The content header may comprise information such as network caller identification (NCID) and version information, protocol version information, beginning sequence number and end sequence number, and message length. Each segment of the content header may comprise a limited amount of data space (e.g., 1 or 2 bytes each). In the transmission, the content header may be followed or preceded by the content data. The content data may include the low storage sized encoded map image, along with additional data information (discussed in greater detail below).

In certain embodiments, the content header and content data may be bookended on the front end and back end by a buffer header and a buffer trailer, respectively. In some embodiments, the buffer header may comprise service sync (start) information and/or a buffer length. The buffer trailer may comprise a cyclic redundancy check (CRC) and/or service sync (end) information. Like the content header information, each component of the buffer header and trailer may comprise a limited amount of data space (e.g., 1 or 2 bytes each).

In certain embodiments, a plurality of content headers and content data (e.g., more than one map image) may be included between the buffer header and buffer trailer. Such a flexible payload approach (i.e., one or more content buffers) instead of a fixed length payload allows for the distribution channel to optimize and control the type of images that can be streamed to the device.

As mentioned above, the content data includes the map image itself, or a fraction of the overall map image to the extent the image is broken up into multiple payloads. The map image may be encoded and stored as an image byte stream. The image may be stored in .jpeg or .png format. Other image format options are also available.

In addition to the encoded image, the content data may include various fields of information included in the overall transmission message. For example, in one field, the content data may include date and time information associated with the image data. The time stamp may be expressed in coordinated universal time (UTC) format in 33 bits of data (e.g., expressed as YYYYYYYMMMMDDDDDhhhhhmm-mmmmsssss).

The content data may also comprise information regarding the number of images included with the transmission (expressed as an integer value). The content data may also include latitude and longitude information to form a bounding box for each image. For example, the content data may include information regarding one corner of the bounding box (e.g., the Southwest latitude and longitude values), as well as the opposite corner of the bounding box (e.g., the Northeast latitude and longitude values). The latitude information may be expressed as an integer (e.g., 0=N, 1=S), followed by the value associated with the geographic coordinate from the equator (e.g., three digits for the degrees, and five digits for the decimal degrees). The longitude information may also be expressed as an integer (e.g., 0=E, 1=W), followed by the value associated with the geographic coordinate from the prime meridian (e.g., three digits for the degrees, and five digits for the decimal degrees).

The content data may also include information regarding the length of an image description (e.g., an integer value indicating the length of the description where the value '0' indicates no description). The image description may also be provided, to the extent one exists. The description may be encoded in UTF-8 characters and comprise between 1 and 255 bytes.

The content data may also include information regarding the type of encoded image. For example, an image type value of '0' may refer to a compressed .jpeg image. A value of '1' may refer to a .png image. Values of '2', '3', etc. may be saved for future use for different types of encoded images.

The content data may include information regarding the view type of the encoded image (such as whether the encoded image represents a downtown view, a view of an entire metropolitan area, or a view of a segment of a city).

The content data may also include a preferred pixel per inch (PPI) value upon decoding the image. The preferred PPI value may be stored as an integer representing the preferred value for displaying the image clearly on the navigation device.

The content data may include the size of the image (in bytes).

To the extent more than one image is being encoded for transmission, the image data is repeated for each additional image (e.g., latitude/longitude data, image description, image type, image byte stream, etc.).

One embodiment of the overall formatted content data is provided in the table below. As shown in the table, certain segments are reserved for future use to potentially encode and include additional information in the transmission.

TABLE

Map Image Transmission Message Format

| Order | Size | Field Name | Description |
|---|---|---|---|
| 1 | 7 bits | Reserved for future use ("RFU") | |
| 2 | 33 bits | Date/Time | Time stamp expressed in UTC. 33 bits used as: YYYYYYYMMMMDDDDDhhhhhmmmmmmsssss |
| 3 | 1 byte | Number of images | Integer value for number of images embedded. |
| 4 | 26 bits | Southwest Latitude | Southwest Latitude of the bounding box for the next image. Expressed as Integer for sign (0 = N, 1 = S), then degrees and decimal degrees to five |

TABLE-continued

Map Image Transmission Message Format

| Order | Size | Field Name | Description |
|---|---|---|---|
| | | | decimal digits. Degrees value are three digits, decimal part is five digits. |
| 5 | 26 bits | Southwest Longitude | Southwest Longitude of the bounding box for the next image. Expressed as Integer for sign (0 = E, 1 = W), then degrees and decimal degrees to five decimal digits. Degrees value are three digits, decimal part is five digits. |
| 6 | 26 bits | Northeast Latitude | Northeast Latitude of the bounding box for the next image. (As Order 4). |
| 7 | 26 bits | Northeast Longitude | Northeast Longitude of the bounding box for the next image. (as Order 5). |
| 8 | 1 byte | Length of Image Description | Integer value indicating Length of Image Description. Value = 0 means there is no description. |
| 9 | 1 ... 255 bytes | Image Description (UTF-8) | Description of the next image. UTF-8 characters. |
| 10 | 4 bits | Reserved for future use ("RFU") | |
| 11 | 2 bits | Image Type | 0 = jpg, 1 = png, 2 = RFU, 3 = RFU |
| 12 | 2 bits | View Type | 0 = Downtown View, 1 = Suburban View 2 = RFU 3 = RFU |
| 13 | 2 bytes | Preferred Display PPI (Pixels) | Integer value for Preferred Pixel per inch value to display the picture clearly |
| 14 | 2 bytes | Size of Image (in Bytes) | Integer value indicating Number of Bytes in the next image byte stream |
| 15 | 1 ... n bytes | Image byte Stream | Byte stream of the image. Variable length |
| 16 | | Repeating fields from 4 to 13 for each additional image | |

Transmitting the Encoded Map Image Data

Following the formatting and encoding of the map image data, a server processor may instruct the transmitter to relay the encoded image(s) in an over-the-air signal (e.g., an AM or FM radio signal) to a receiver connected to the navigation device. In certain embodiments, multiple payloads of encoded image data are transmitted. In such cases, the multiple payloads may be transmitted in a specific order for decoding.

In situations with limited connectivity and one-way communication between a transmitter and the navigation device, the navigation device may be able to receive transmissions from a transmitter. With two-way communication between a transmitter and server-side receiver and the navigation device, the navigation device may be able to receive transmissions from a transmitter and also send transmissions back to a receiver. For example, the navigation device may be able to send signals to the receiver. The navigation device transmission signals may include information regarding its current geographic position or user input information such as the level of detail or zoom level requested. In turn, the transmitter/receiver may relay the navigation device information for processing. Such communication from the navigation device may assist in determining the specific transmission signal to return to the navigation device.

In certain embodiments, the transmitter/receiver may be in communication with a network having access to real-time or current traffic conditions. The transmitter/receiver and network may also be in communication with a processor capable of running predictive algorithms to determine traffic conditions for inclement weather, traffic accidents, or construction scenarios. For example, the predictive algorithm may be able to calculate what the road traffic may look like in the future based on the weather or a recent traffic accident, and be able to determine what traffic map image to generate.

Receiving and Decoding the Map Image Data

After the navigation device has received a signal from an external transmitter with the encoded map image(s), the navigation device may then decode the map image(s).

In certain embodiments, based on the encoded map image data described above, a receiver connected to a navigation device may be able to ensure that complete frames of image data are received. Additionally, the navigation device receiver may be able to confirm that complete buffers of content are received. Further, the formatted or encoded data may allow the navigation device receiver to decode and reassemble the data.

In certain embodiments, the navigation device may validate and decode the received transmission by finding the start of the service sync in the buffer header. Additionally, the navigation device may validate the buffer length and the cyclic redundancy check value.

Further, for each content data transmitted, the decoding process may include: (1) storing the sequence number and end sequence number, (2) storing the message length, (3) copying the message length bytes to a data buffer, and (4) using the sequence number to place the image data in the correct position in the received data stream.

In certain embodiments, if the data is out of order, or if the CRC validation fails, the content data should be dropped or rejected by the navigation device receiver.

Displaying the Decoded Map Image

After the navigation device has decoded the transmitted map image data from the external transmitter, the navigation device may display a decoded image on the navigation device or a display in communication with the navigation device.

In certain embodiments, more than one image may be decoded. In these situations, the end-user or the navigation device processor may determine or select which image to display. For example, the end-user or the navigation device processor may select between a view of the entire metropolitan area versus a view of the downtown area. In other embodiments, the selection may include how the image is displayed (e.g., a daytime view or a nighttime view of traffic conditions, a daytime or a nighttime view of weather conditions in the area). In some embodiments, the selected view may be determined by a navigation device processor without user input. The processor may determine which image or portion of an image to display based upon the geographic location of the navigation device (e.g., GPS location). The processor may also determine which image or portion of an image to display (e.g., a daytime image or a nighttime image) based on the time of day and time of year. For example, if the navigation device processor is aware that the time is 9:00 p.m. in Chicago in December, the processor may select a nighttime image to be displayed (if available) on the navigation device screen as a default without end-user input.

In yet other embodiments, the end-user or navigation device processor may adjust the view of a particular map image or combination of map images to center the displayed image at the location of the end-user/navigation device. For example, the navigation device may be able to use a global positioning system locally on the device to determine whether the navigation device is located on a highway or local road, and which map image(s) to display. In other embodiments, the end-user may be able to provide input to the navigation device regarding the location of the navigation device, the level of detail requested, or the zoom level requested.

Repeating/Refreshing the Map Reporting

The process of (1) determining the map condition (e.g., real-time traffic or weather), (2) encoding the map image data, (3) transmitting the encoded map image data to a navigation device, (4) decoding the image data, and (5) displaying the decoded map image data may be repeated at set or variable intervals of time. In situations of one-way or two-way limited bandwidth communication, encoded map image data may be relayed to the navigation device continuously, at set times, or at random times only where the traffic condition has changed from the last reporting.

As discussed above, advantages of these systems, apparatuses, and methods include that even low cost devices (e.g., devices without digital maps and little or no internet protocol connectivity) may be able to use digitized AM/FM signals to gain access to real time traffic data in and around the device's location. Additionally, the transmission of a flexible payload approach (i.e., one or more content buffers) instead of a fixed length payload allows for the distribution channel to optimize and control the type of images that can be streamed to the device. Further, the CRC check allows for retention of quality of images that are transmitted over-the-air. Also, the process allows for flexibility in terms of how the map level of images may be combined or separated with traffic data related colors that are rendered on the road segments. The encoding and decoding process is also agnostic to the size, format and type of images. For example, one implementation could send ten different lower quality, compressed .jpeg images to represent more complex traffic in cities such as New York, compared with just two images for Kansas City (where traffic density may not be as high). Additionally, as mentioned above, the encoding and decoding process may be performed for additional or alternative information such as weather data, accidents, or other "special events" that may be highlighted on the map image and transmitted in a similar fashion.

Figure 3:
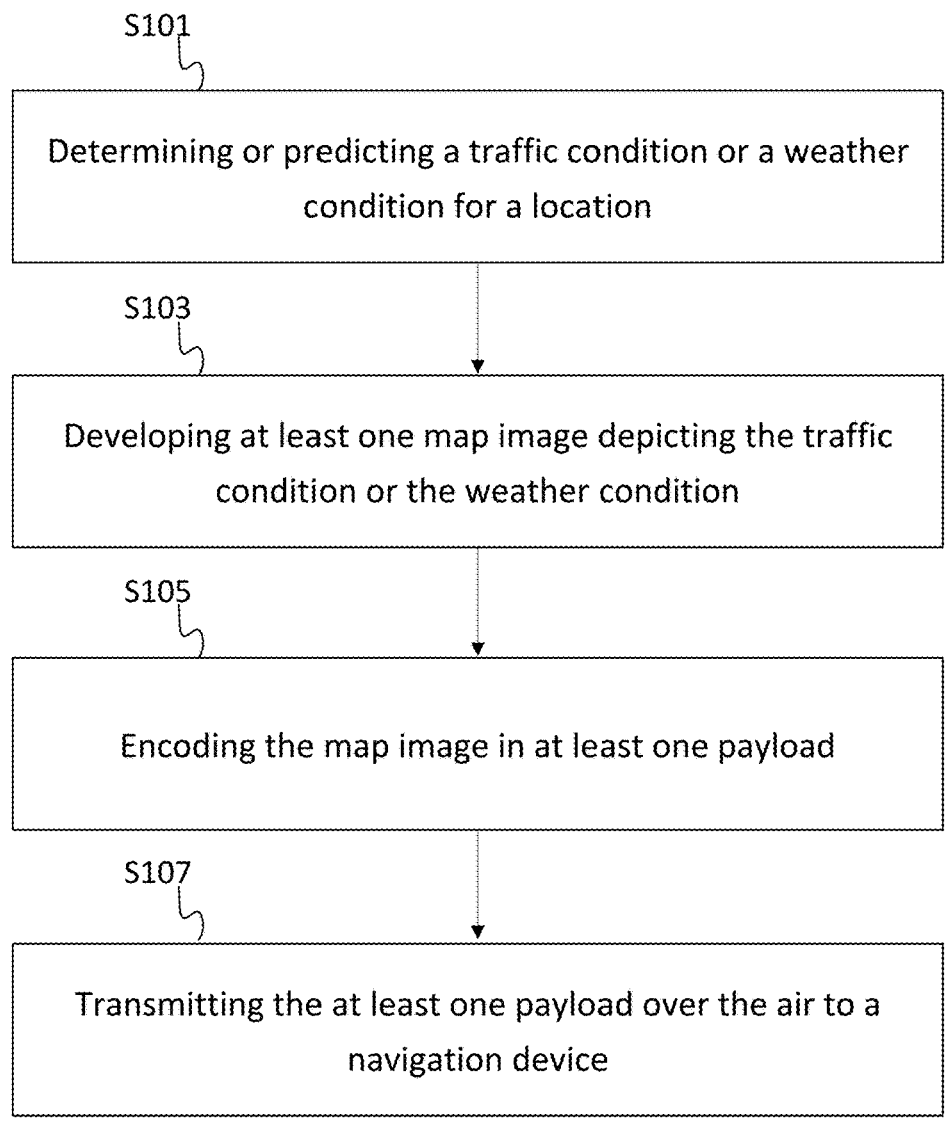
FIG. 3 illustrates an example flowchart for transmitting map data images in a limited bandwidth environment.

FIG. 3 illustrates an example flowchart for transmitting map data images in a limited bandwidth environment. The process of the flowchart may be performed by a map database server and its processor and/or navigation device and its processor. Alternatively, another device may be configured to perform one or more of the following acts. Additional, fewer, or different acts may be included.

At act S101, a traffic condition or a weather condition is determined or predicted using a map database processor. The traffic or weather condition for a location may be determined based a collection and analysis of real-time traffic or weather data. Alternatively or additionally, the traffic or weather condition may be determined from a collection and analysis of real-time, historical, and/or predictive traffic or weather data.

At act S103, at least one map image may be developed from the traffic or weather data. A traffic map image may include road segments that are color-coded or marked with dashed lines to represent the type of traffic pattern present on the road segment in each of the images.

At act S105, the at least one map image is encoded in at least one payload for transmission. For example, larger developed map image files may be broken up into smaller data files to be transmitted in multiple payloads. The map image may be encoded with content header information such as a beginning sequence number and an end sequence number for each image segment or payload. The map image may also be encoded with other information such as a timestamp, a total number of images in the transmission, a bounding box (latitude/longitude coordinates) for the image(s), an image description, an image type identifier or value, an image view identifier, a preferred pixel per inch value for the decoded image, and/or a size of the image.

At act S107, following the encoding of the at least one map image, each encoded image may be transmitted in at least one payload over-the-air to a navigation device for further processing. The transmission may occur via an AM or FM signal. Further, each transmission may be monitored to be below a threshold size for processing in a limited bandwidth environment.

Figure 4:
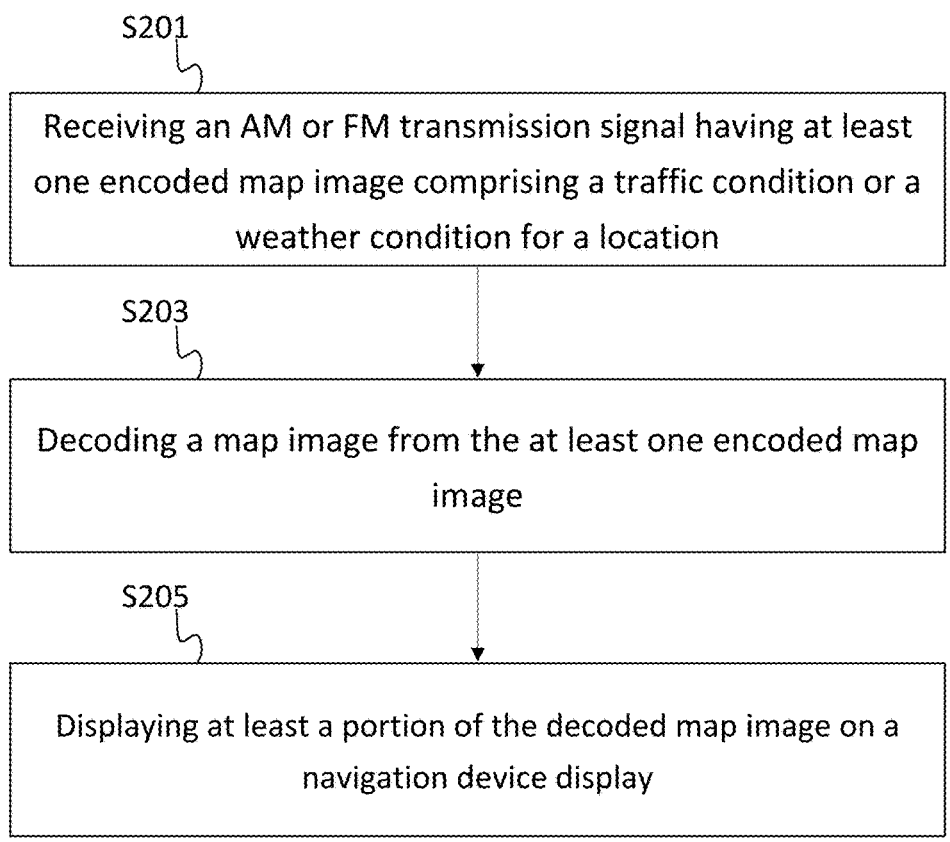
FIG. 4 illustrates an example flowchart for receiving and processing encoded map data images in a limited bandwidth environment.

FIG. 4 illustrates an example flowchart for receiving and processing encoded map data images in a limited bandwidth environment. The process of the flowchart may be performed by a navigation device and its processor and/or a server and its processor. Alternatively, another device may be configured to perform one or more of the following acts. Additional, fewer, or different acts may be included.

At act S201, an AM or FM transmission signal is received by a navigation device receiver. The signal comprises at least one encoded map image with traffic or weather information. In certain embodiments, the at least encoded one map image is received in a plurality of payloads, wherein each payload of the plurality of payloads comprises a beginning sequence number and an end sequence number.

At act S203, each transmitted map image may be decoded by a server or processor in communication with the navigation device. The decoding may comprise combining a plurality of payloads in order of sequencing numbers of each payload to provide the decoded map image.

At act S205, at least a portion of the decoded map image may be displayed on a navigation device display. In certain embodiments, the end-user or the navigation device processor may determine or select which image to display or which portion of an image to display.

Figure 5:
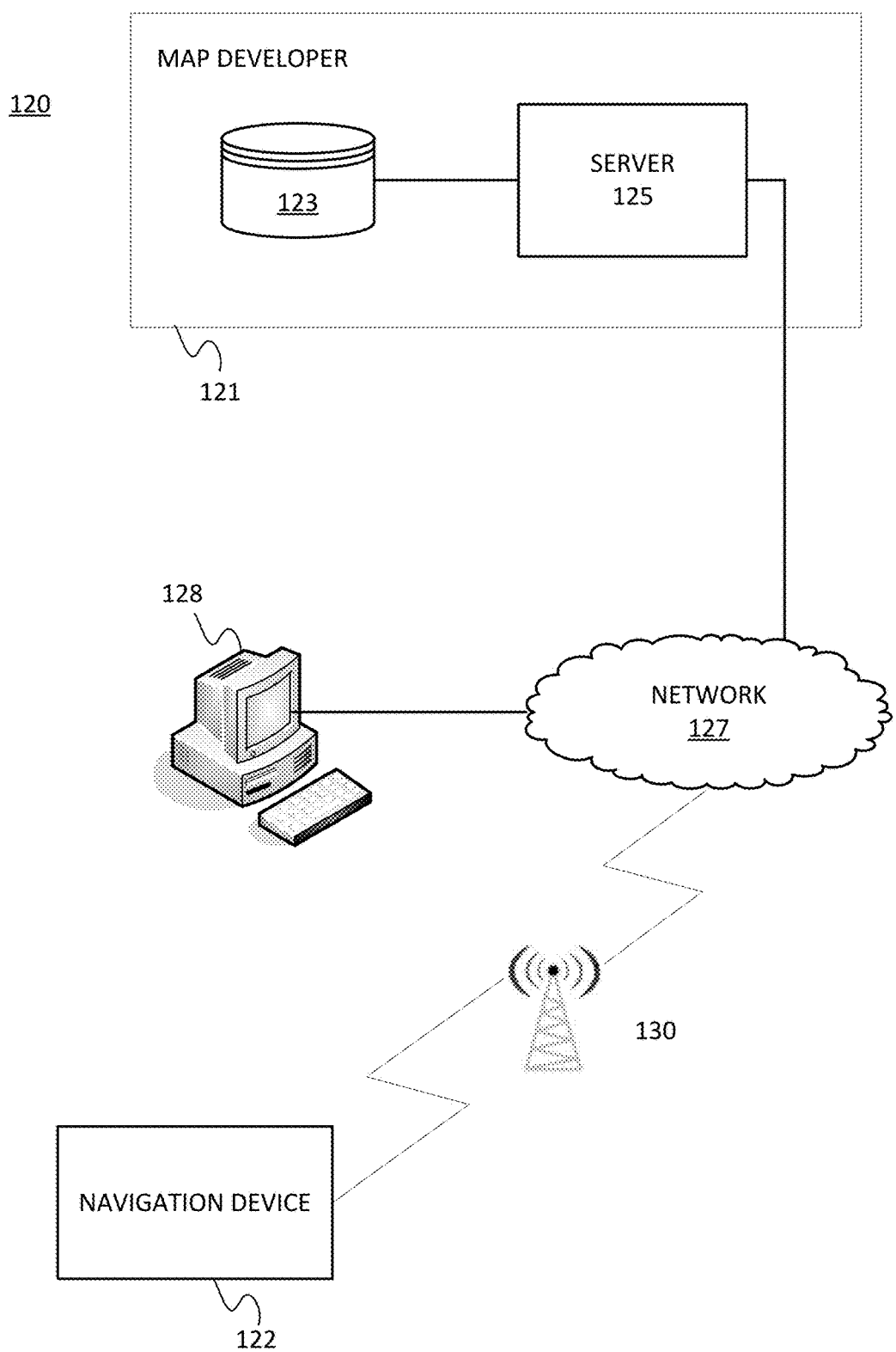
FIG. 5 illustrates an example system for a map data image management system.

As discussed above, transmitting and receiving map data in a limited bandwidth environment may be performed by a navigation device and its processor and/or a server and its processor. FIG. 5 illustrates one embodiment of a map data image management system 120. The system 120 may include a map developer system 121, a navigation device 122, a workstation 128, and a network 127. Additional, different, or fewer components may be provided.

The navigation device 122 may be a personal navigation device ("PND"), a portable navigation device smart phone, a mobile phone, a personal digital assistant ("PDA"), a tablet computer, a notebook computer, and/or any other known or later developed mobile device or personal computer. Non-limiting embodiments of navigation devices may also include RDS devices, mobile phone devices, or car navigation devices such as Garmin or TomTom.

The map developer system 121 includes a server 125 and a server database 123. The developer system 121 may include computer systems and networks of a system operator such as HERE, NAVTEQ, or Nokia Corporation. The server database 123 is configured to store traffic map images developed from historical traffic data or predictive traffic data. The database 123 is also configured to store identification keys associated with the traffic map images.

The developer system 121, the workstation 128, and the navigation device 122 are coupled with the network 127. The phrase "coupled with" is defined to mean directly connected to or indirectly connected through one or more intermediate components. Such intermediate components may include hardware and/or software-based components. In certain embodiments, the navigation device 122 may be coupled with the network through a radio transmitter/receiver 130, which may transmit "over-the-air" radio transmission signals (e.g., an AM or FM signal) to the navigation device 122. In some embodiments, the radio transmitter/receiver 130 may receive transmission signals from the navigation device 122.

The workstation 128 may be a general purpose computer including programming specialized for providing input to the server 125. For example, the workstation 128 may provide settings for the server 125. The settings may include a value for the predetermined interval that the server 125 requests the navigation device 122 to relay current geographic locations. The workstation 128 may be used to enter data indicative of GPS accuracy to the database 123. The workstation 128 may include at least a memory, a processor, and a communication interface.

Figure 6:
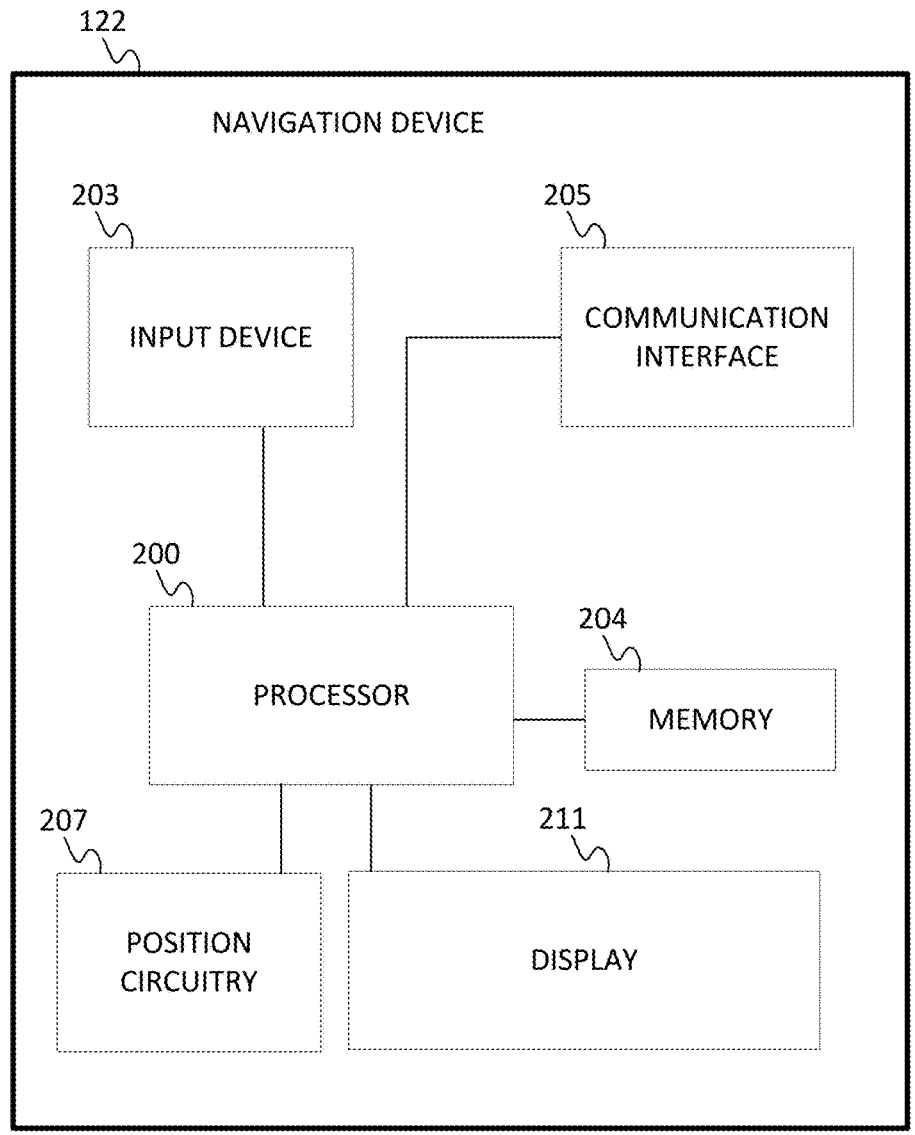
FIG. 6 illustrates an exemplary navigation device of the system of FIG. 5.

FIG. 6 illustrates an exemplary navigation device 122 of the system of FIG. 5. The navigation device 122 includes a processor 200, a memory 204, an input device 203, a communication interface 205, position circuitry 207, and a display 211. Additional, different, or fewer components are possible for the mobile device/personal computer 122. In certain embodiments, the communication interface 205 of the navigation device 122 comprises an AM and/or FM radio receiver. The receiver may be a high-definition radio receiver.

The processor 200 may be configured to receive data indicative of the location of the navigation device 122 from the position circuitry 207. The positioning circuitry 207, which is an example of a positioning system, is configured to determine a geographic position of the navigation device 122. The positioning system may also include a receiver and correlation chip to obtain a GPS signal. The positioning circuitry may include an identifier of a model of the positioning circuitry 207. The processor 200 may access the identifier and query a database or a website to retrieve the accuracy of the positioning circuitry 207 based on the identifier. The positioning circuitry 207 may include a memory or setting indicative of the accuracy of the positioning circuitry.

Figure 7:
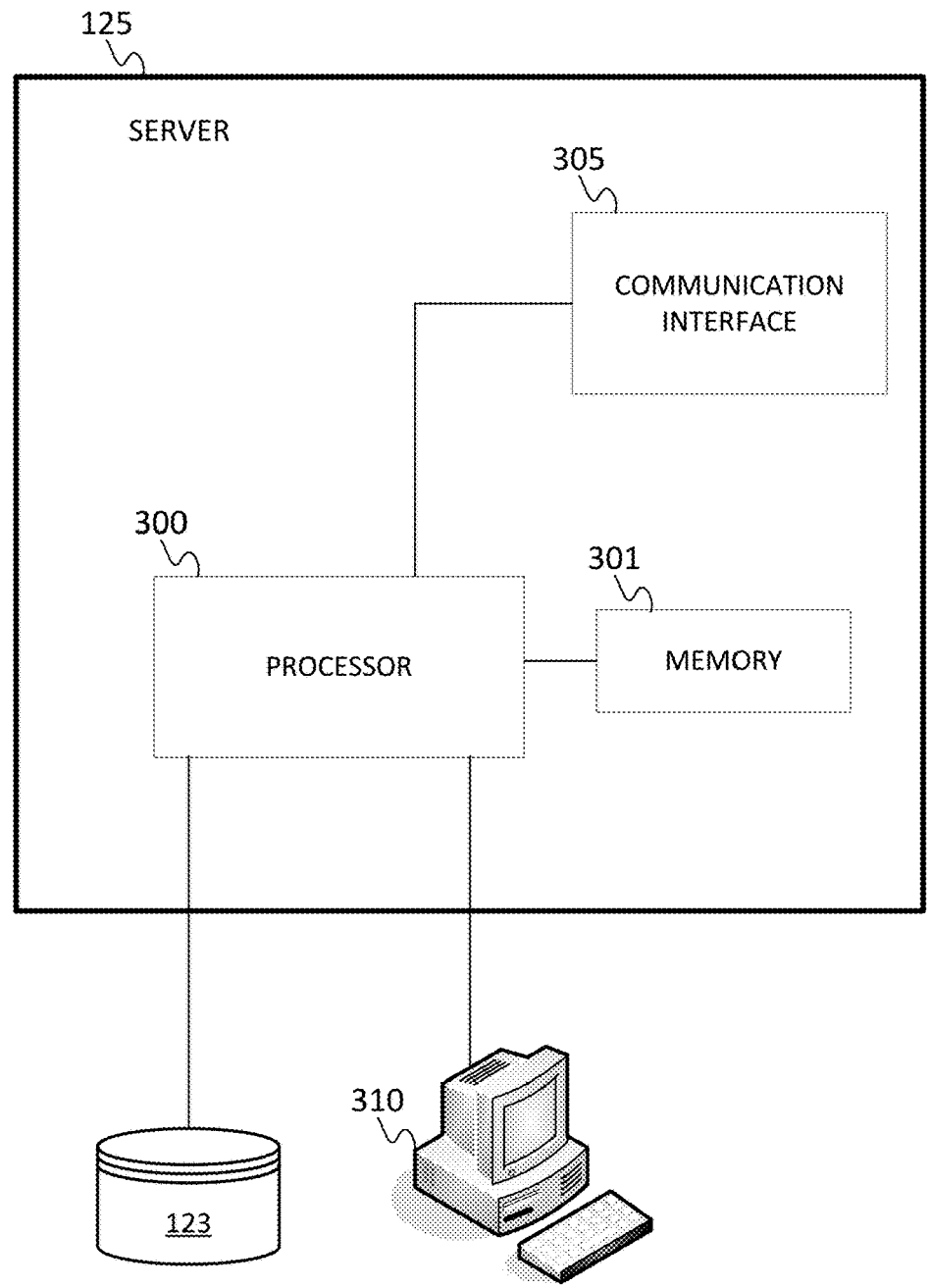
FIG. 7 illustrates an exemplary server of the system of FIG. 5.

FIG. 7 illustrates an exemplary server 125 of the system of FIG. 5. The server 125 includes a processor 300, a communication interface 305, and a memory 301. The server 125 may be coupled to a database 123 and a workstation 128. The workstation 128 may be used as an input device for the server 125. In addition, the communication interface 305 is an input device for the server 125. In certain embodiments, the communication interface 305 may receive data indicative of use inputs made via the workstation 128 or the navigation device 122.

The navigation device processor 200 and/or the server processor 300 may include a general processor, digital signal processor, an application specific integrated circuit (ASIC), field programmable gate array (FPGA), analog circuit, digital circuit, combinations thereof, or other now known or later developed processor. The navigation device processor 200 and/or the server processor 300 may be a single device or combinations of devices, such as associated with a network, distributed processing, or cloud computing.

The navigation device processor 200 and/or the server processor 300 may also be configured to cause an apparatus to at least perform at least one of traffic map image retrieval methods described above. For example, the navigation device processor 200 may be configured to perform the process: (1) receive, via an over-the-air AM or FM radio transmission signal, at least one encoded map image, the at least one encoded map image comprising a traffic condition or weather condition for a location; (2) decode a map image from the at least one encoded map image; and (3) display at least a portion of the decoded map image on a navigation device screen.

In another embodiment, the server processor 300 may be configured to perform the process: (1) determine or predict a traffic condition or a weather condition for a location; (2) develop at least one map image depicting the traffic condition or the weather condition; (3) encode the map image in at least one payload; and (4) transmit the at least one payload over-the-air to a navigation device.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the navigation device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

In certain embodiments, receiving and decoding of the encoded map image on the navigation device may be used to provide functions for an autonomous vehicle. An autonomous vehicle is self-driving and may be referred to as a robot vehicle or an automated vehicle. The autonomous vehicle may include passengers but no driver is necessary. The navigation device 122 or another computer system in communication with the navigation device 122 may include instructions for routing the vehicle or operating the vehicle. An estimated travel time may be calculated based on the traffic map data and a route may be chosen based on the estimate travel time. The computing system may generate driving commands for steering the vehicle, shifting gears, increasing and decreasing the throttle, and braking. The computing system may generate auxiliary commands for controlling the headlights, turn signals, windshield wipers, defrost, or other auxiliary functions not directly related to the movement of the vehicle.

The autonomous vehicle may include sensors for identifying the surrounding and location of the car. The sensors may include GPS, light detection and ranging (LIDAR), radar, and cameras for computer vision. Proximity sensors may aid in parking the vehicle. The proximity sensors may detect the curb or adjacent vehicles. The autonomous vehicle may optically track and follow lane markings or guide markings on the road.

In the above described embodiments, the network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols. In certain embodiments, the network may be in communication with a radio transmitter/receiver 130 that produces and/or receives AM or FM signal to communicate with the navigation device 122.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., E PROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A method of transmitting map images in a limited bandwidth environment, the method comprising:
    determining or predicting, using a processor, a traffic condition for a location;
    developing, by the processor, a real-time traffic map image depicting the traffic condition;
    breaking up, by the processor, the real-time traffic map image including the traffic condition into a plurality of image segments based on a size limit per payload, wherein a quantity of images for the plurality of images is based on a traffic density for the location;
    encoding, by the processor, the plurality of image segments broken up from the real-time traffic map image into a plurality of payloads, each payload comprising content data for an image segment, wherein the content data includes latitude and longitude coordinates for opposite corners of a bounding box of the image segment; and
    transmitting, by the processor, the plurality of payloads of the encoded real-time traffic map image including the traffic condition over an AM or FM radio signal to a navigation device in the limited bandwidth environment in a defined order such that the navigation device is configured to decode and reassemble the plurality of image segments according to the latitude and longitude coordinates for opposite corners of a bounding box for display as a single map image including the traffic condition.

2. The method of claim 1, wherein the single map image comprises (1) a daytime map image of a metropolitan area, (2) a nighttime map image of the metropolitan area, (3) a daytime map image of a downtown area of a city, or (4) a nighttime map image of the downtown area.

3. The method of claim 1, wherein the real-time traffic map image is encoded with buffer header and buffer trailer data, wherein the buffer trailer data includes a cyclic redundancy check.

4. The method of claim 1, wherein the plurality of payloads comprises content data representing a view type of the encoded map image, the view type being selected from the group consisting of a downtown view, a view of an entire metropolitan area, or a view of a segment of a city.

5. The method of claim 1, wherein the limited bandwidth environment is a one-way communication environment where the navigation device is able to receive the radio signal but is not able to transmit a signal to the processor.

6. The method of claim 1, wherein latitude and longitude coordinates are provided for only two opposite corners of the bounding box for each image segment.

7. The method of claim 1, wherein each payload is less than 4 kilobytes.

8. The method of claim 1, further comprising:
repeating the determining, the developing, the breaking up, the encoding, and the transmitting at a set interval of time.

9. The method of claim 1, further comprising:
repeating the determining, the developing, the breaking up, the encoding, and the transmitting when the traffic condition has changed.

10. An apparatus comprising:
    at least one processor; and
    at least one memory including computer program code for one or more programs; the at least one memory and the computer program code configured to, with the at least one processor, cause the apparatus to at least perform:
    determine or predict a traffic condition for a location;
    develop at least one real-time map image depicting the traffic condition;
    break up the map image into a plurality of image segments based on a size limit per payload, wherein a quantity of images for the plurality of images is based on a traffic density for the location;
    encode the plurality of image segments of the map image into a plurality of payloads, each payload comprising content data for an image segment, wherein the content data includes latitude and longitude coordinates for opposite corners of a bounding box of the image segment; and
    transmit the plurality of payloads of the encoded map image over an AM or FM radio signal to a navigation device in a limited bandwidth environment in a defined order such that the navigation device is configured to decode and reassemble the plurality of image segments for a plurality of map images according to the latitude and longitude coordinates for the bounding box for display as a single map image including the traffic condition.

11. The apparatus of claim 10, wherein the map image is encoded with buffer header and buffer trailer data, wherein the buffer trailer data includes a cyclic redundancy check.

12. A non-transitory computer readable medium including instructions that when executed by a processor are configured to perform a method of transmitting map images in a limited bandwidth environment, the method comprising:
    determining or predicting a traffic condition for a location;
    developing a real-time map image depicting the traffic condition;
    breaking up the map image into a plurality of image segments based on a size limit per payload, wherein a quantity of image segments is based on a traffic density for the location;
    encoding the plurality of image segments of the map image into a plurality of payloads, each payload comprising content data for an image segment, wherein the content data includes latitude and longitude coordinates for opposite corners of a bounding box of the image segment; and
    transmitting the plurality of payloads of the encoded map image over a radio signal to a navigation device in the limited bandwidth environment in a defined order such that the navigation device is configured to decode and reassemble the plurality of image segments according to the latitude and longitude coordinates for opposite corners of a bounding box for display as a single map image including the traffic condition.

* * * * *